US006454034B1

(12) United States Patent
Gotz

(10) Patent No.: US 6,454,034 B1
(45) Date of Patent: Sep. 24, 2002

(54) FORK LIFT TRUCK

(75) Inventor: Bernhard Gotz, Aschaffenburg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/420,633

(22) Filed: Oct. 20, 1999

(30) Foreign Application Priority Data

Oct. 28, 1998 (DE) ........................................ 198 49 770

(51) Int. Cl.[7] .................................................. B62D 7/22

(52) U.S. Cl. ................ 180/89.12; 180/759; 296/190.07

(58) Field of Search ............................... 180/68.4, 300, 180/414, 267, 280, 756, 759, 89.12; 296/190.07, 29; 123/198 E, 192, 195 R, 195 C, 90.38; 280/756, 759

(56) References Cited

U.S. PATENT DOCUMENTS 2,693,250 A * 11/1954 Barrett .......................... 187/9
3,350,042 A * 10/1967 Stewart et al. ................ 248/22
3,710,965 A * 1/1973 Joosten ....................... 214/515
3,741,346 A * 6/1973 Herdemann .................... 187/9
3,949,892 A * 4/1976 Ohms ......................... 214/674
3,954,194 A * 5/1976 Stedman ...................... 294/106
4,161,992 A * 7/1979 Abels et al. ................. 180/306
4,261,105 A * 4/1981 Love ........................... 30/383
4,286,777 A * 9/1981 Brown ...................... 267/63 R
4,432,424 A * 2/1984 Abels et al. ............... 180/6.48
4,435,113 A * 3/1984 Mosely et al. .............. 414/347
4,694,928 A * 9/1987 Barton et al. ............... 180/268
4,854,278 A * 8/1989 Honecker ............... 123/198 E
5,110,081 A * 5/1992 Lang, Jr. .................... 248/635
5,152,658 A * 10/1992 Martin ....................... 414/635
5,788,452 A * 8/1998 Brouwer et al. ............ 414/631

* cited by examiner

*Primary Examiner*—Paul N. Dickson
*Assistant Examiner*—Paul Royal, Jr.
(74) *Attorney, Agent, or Firm*—Webb Ziesenheim Logsdon Orkin & Hanson, P.C.

(57) ABSTRACT

An industrial truck, in particular a fork lift truck, is provided having a one-piece or multiple-piece vehicle frame, a driver's cab and one or more oscillation-generating components. The driver's cab has a rigid connection to the vehicle frame, with at least one elastic damping element located between at least one oscillation-generating component and a part of the vehicle frame connected with the driver's cab. At least one oscillation-generating component can be fastened directly or indirectly to the rear weight.

15 Claims, 4 Drawing Sheets

FORK LIFT TRUCK

BACKGROUND OF THE INVENTION

1. Field of the Invention

This invention relates generally to an industrial truck and, more particularly, to a fork lift truck with a one-piece or multiple-piece vehicle frame, a driver's cab and one or more components that generate oscillations.

2. Description of the Currently Available Technology

On industrial trucks configured as fork lift trucks, a vehicle frame is located between a rear weight and a lifting platform. The vehicle frame can be formed in one piece or it can consist of a plurality of pieces that are detachably connected to one another. A vertically movable load holding device is fastened to the lifting platform. The forces and moments that act on the lifting platform are supported on the vehicle frame. The vehicle frame is rigidly connected with a rear weight of the fork lift truck, which rear weight is generally in the form of a cast metal block.

Industrial trucks have a whole series of components that generate oscillations that can cause undesirable vibrations and noises. The oscillation-generating components include, for example, an internal combustion engine or a hydraulic system with various hydraulic units and assemblies (e.g. pump, motors, cylinder, lines). Components and assemblies that generate oscillations also include the lifting platform of the industrial truck, which has an inherent tendency to oscillate on account of the weight of the loads lifted and of the lifting platform itself, as well as the wheels, if the industrial truck is traveling on an uneven road surface.

It is particularly important to keep the oscillations caused by the above mentioned components from being transmitted to the driver on board the industrial truck. For this purpose, the prior art mounts the driver's cab on resilient rubber pads on the vehicle frame. These resilient rubber pads are designed to prevent the transmission of vibrations, including structure-borne noise, into the vicinity of the driver. In this solution of the prior art, the above mentioned components that generate oscillations are generally rigidly connected with the vehicle frame.

This solution of the prior art has the disadvantage that the vehicle frame and the driver's cab must be formed from separate assemblies, and are therefore complex and expensive to manufacture. An additional disadvantage is that the oscillations that originate from the components in question are transmitted directly to the vehicle frame, as a result of which the vehicle frame is excited to resonant oscillations. These resonant oscillations significantly increase the noise of the industrial truck as perceived by the driver and by persons outside the industrial truck.

Therefore, it is an object of the invention to provide an easily manufactured industrial truck that is characterized by a low level of vibrations and noise during operation.

SUMMARY OF THE INVENTION

The invention teaches that, on an industrial truck with a driver's cab, the driver's cab has a rigid connection with the vehicle frame and there is at least one elastic damping element between at least one oscillation-generating assembly and a part of the vehicle frame that is connected with the driver's cab. The driver's cab can be connected to the vehicle frame by means of threaded fasteners, for example. It is also within the scope of the invention if the driver's cab is formed at least partly by the vehicle frame.

The effort and expense involved in the manufacture of the industrial truck can be significantly reduced if there need not be any resilient rubber elements between the driver's cab and the vehicle frame, because it is no longer necessary to separate these two components. The generation of noise in the industrial truck is prevented by the fact that elastic damping elements are located between the respective oscillation-generating assembly and the part of the vehicle frame connected with the driver's cab, and these damping elements are configured so that they absorb the oscillation frequencies and amplitudes that occur. The transmission of oscillations to the vehicle frame and thus to the driver's cab can be directly prevented, as a result of which resonances in the vehicle frame are also prevented.

On an industrial truck with a rear weight, the invention teaches that at least one oscillation-generating component is directly or indirectly fastened to the rear weight. The large mass of the rear weight, which is generally made of gray cast iron, cannot be excited to vibrate by the forces generated by the oscillation-generating components. The rear weight therefore transmits neither structure-borne noise nor vibrations to the vehicle frame or to the driver's cab of the industrial truck.

It is particularly advantageous if the industrial truck has at least one oscillation-generating hydraulic unit that is fastened directly or indirectly by means of an elastic damping element to the part of the vehicle frame that is connected with the driver's cab. Because of the design of the pump, the flow of hydraulic fluid out of a hydraulic pump always has pressure pulses. These pressure pulses result in a vibration of the hydraulic pump itself, of the valves and lines that are connected with the hydraulic pump, and of the hydraulic users that are connected to it, which are generally in the form of hydraulic motors or hydraulic cylinders. A transmission of these oscillations to the vehicle frame can be prevented if the above mentioned hydraulic units, like the valves and lines, are fastened to the vehicle frame by means of elastic damping elements. It is thereby important that the hydraulic lines do not have any vibration-transmitting connections to the frame, and in particular that there is no direct contact between the hydraulic lines and the frame.

This advantageous effect can also be achieved if the industrial truck has a drive unit that generates vibrations and has at least one hydraulic unit, whereby the hydraulic unit is fastened to a housing that forms a part of the vehicle frame, and this housing is fastened by means of at least one elastic damping element to the part of the vehicle frame that is connected to the driver's cab. The hydraulic unit of the drive unit can be one or more hydraulic motors, valves and other hydraulic components that are fastened to a common housing. The invention teaches that this housing is connected with the other parts of the vehicle frame by means of elastic damping elements.

If the industrial truck has at least one oscillation-generating lifting platform which is fastened by means of at least one elastic damping element directly or indirectly to the vehicle frame, the oscillations that occur on the lifting platform are also not transmitted to the vehicle frame. In this case, the lifting platform is rotationally connected to the vehicle frame at a first bearing, whereby there is at least one elastic damping element in the vicinity of this bearing between the lifting platform and the vehicle frame. At a second bearing, the lifting platform is connected by means of a hydraulic cylinder with the vehicle frame, whereby between the lifting platform and the hydraulic cylinder and/or between the vehicle frame and the hydraulic cylinder there is at least one elastic damping element.

A particularly good vibration damping action is achieved if at least one oscillation-generating component is fastened by means of at least one elastic damping element to the rear weight. In this arrangement, the transmission of vibrations is prevented on one hand by the damping element and on the other hand by the vibration-damping action of the rear weight as described above. This arrangement is particularly advantageous if the industrial truck has at least one oscillation-generating internal combustion engine which is fastened to the rear weight. It is also possible to fasten an oscillation-generating hydraulic pump to the internal combustion engine. The hydraulic pump and the internal combustion engine thus form a unit and are jointly fastened to the rear weight, for example by means of a damping element.

BRIEF DESCRIPTION OF THE DRAWINGS

Additional advantages and details of the invention are explained in greater detail below with reference to the exemplary embodiment illustrated in the accompanying schematic drawings, in which like reference numbers identify like parts throughout.

DESCRIPTION OF THE PREFERRED EMBODIMENT

Figure 1:
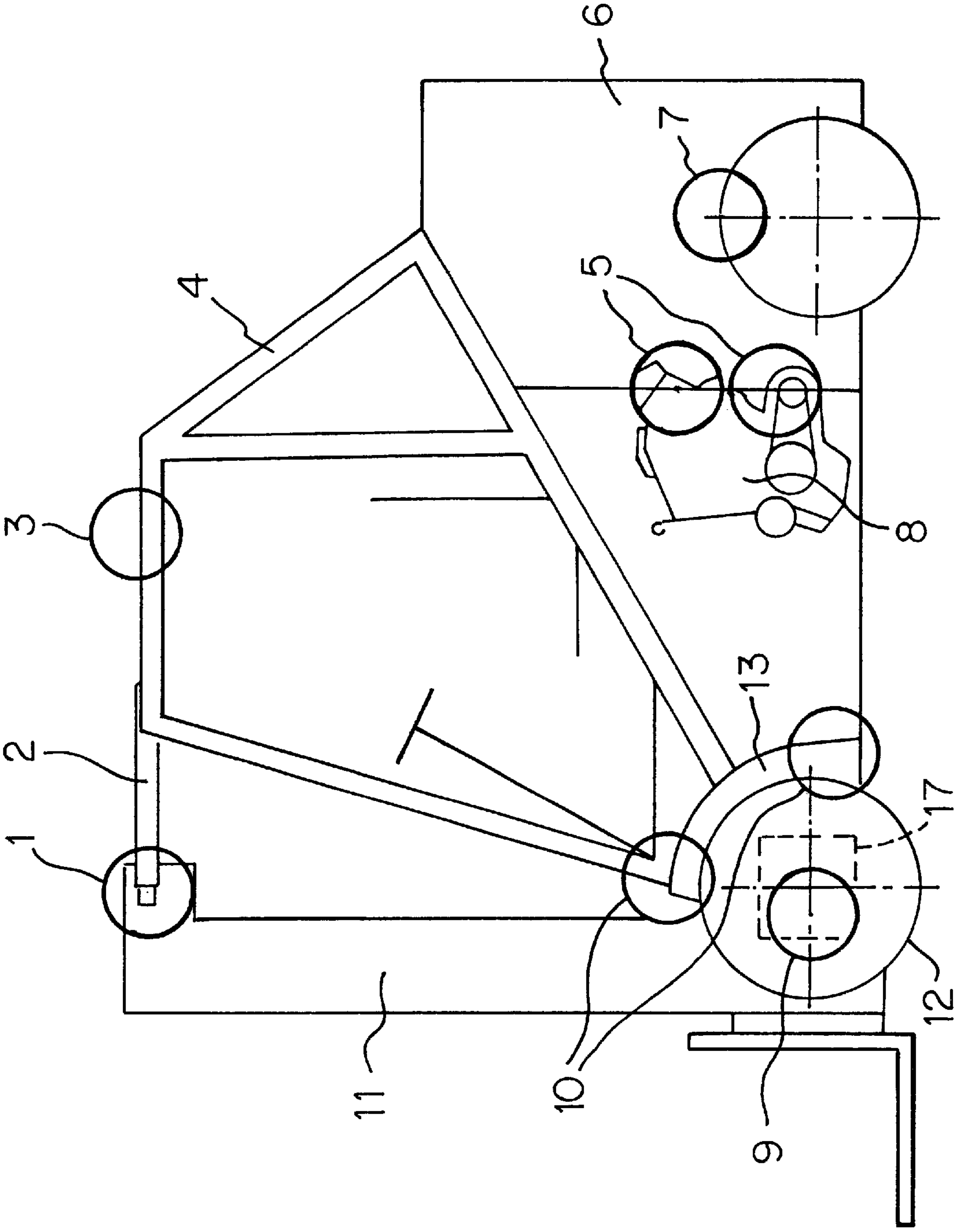
FIG. 1 is a side view of an industrial truck incorporating features of the invention.

FIG. 1 shows an industrial truck in accordance with the invention in the form of a fork lift truck. A rear weight 6 is rigidly fastened to a vehicle frame 4, which simultaneously forms the driver's cab of the industrial truck. A plurality of oscillation-generating components are fastened to the vehicle frame 4 and to the rear weight 6, whereby the fastening points in question are indicated in this illustration by circles 1, 3, 5, 7, 9, and 10.

At the fastening point 5, an internal combustion engine 8 with hydraulic pumps (not shown) attached to it is fastened to the rear weight 5. A rear axle of the fork lift truck is also fastened to the rear weight at the fastening point 7. As a result of the large mass and the internal damping of the cast rear weight 6, the rear weight 6 is not excited to vibrate either by the internal combustion engine 8 or by the rear axle. Therefore, no vibrations and practically no structure-borne noise are transmitted via the rear weight 6 into the vehicle frame 4. In particular at the fastening point 5 for the internal combustion engine 8, there can also be an elastic damping element, by means of which the vibrations that occur during the operation of the internal combustion engine 8 can be compensated. The elastic damping element is schematically represented by the circles (e.g., fastening points) 5 in FIG. 1.

One possible embodiment of the fastening point 5 for the internal combustion engine 8 is described in greater detail in the German patent application filed on the same date under the internal case number A 98/138 (Serial No. 198 49 753.9), which is herein incorporated by reference. In that case, the internal combustion engine 8 is mounted on the rear weight 6 by means of two rocker bearings. Underneath the rocker bearing there is a torque support, by means of which the oscillating movement of the internal combustion engine 8 is limited. The rocker bearings and the torque supports can also have elastic damping elements. The internal combustion engine 8 is oriented in the transverse direction in the fork lift truck. A hydraulic pump is rigidly fastened to the internal combustion engine 8.

With continued reference to FIG. 1, in the forward portion of the fork lift truck, there is a housing 13 of a drive unit 17 which forms a part of the vehicle frame 4. The housing 13 is connected to two fastening points 10 by means of elastic damping elements with the part of the vehicle frame 4 that forms the driver's cab. The front wheels 12 of the fork lift truck are mounted on the housing 13 of the drive unit 17 and are driven by the hydraulic units located in the housing 13 of the drive unit, in this embodiment by two hydraulic motors connected with the front wheels 12. In the housing 13 of the drive group, there are also various other oscillation-generating components, e.g., hydraulic valves.

Figure 2:
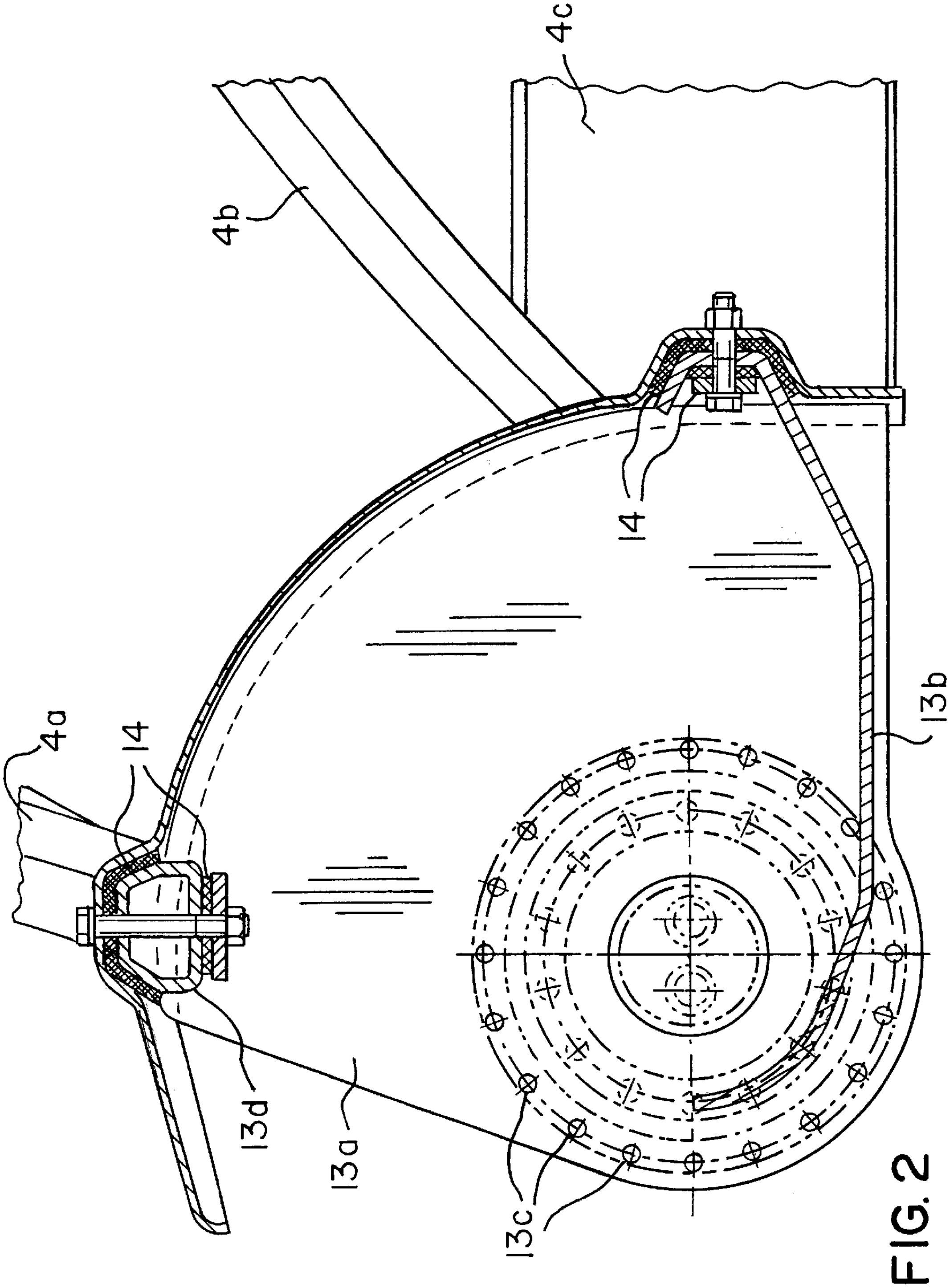
FIG. 2 shows the housing of a drive unit of an industrial truck incorporating features of the invention.

FIG. 2 illustrates one possible embodiment of the elastic connection of the housing 13 of the drive unit 17 with the other part of the vehicle frame 4. The housing 13 includes two side plates 13*a* that are oriented substantially parallel to each other, only one of which is visible in the view shown in FIG. 2. The side plates 13*a* are connected by a curved base sheet or plate 13*b* and by a transverse strut 13*d*. On the side plates 13*a* there is a ring of holes 13*c* for fastening the assemblies of the drive unit 17. The invention teaches that the housing 13 of the drive group is fastened by means of fastening elements 14 to a part of the vehicle frame 4 of the fork lift truck that forms part of the driver's cab. The fastening elements 14 include a first fastening element identified with reference numeral 14*a* for connecting the transverse strut 13*d* to the part or portion of the vehicle frame 4 forming the driver's cab. The first fastening element 14*a* includes one or more elastic damping elements or first elastic damping elements 15. The fastening elements 14 include a second fastening element identified with reference numeral 14*b* for connecting the curved base plate 13*b* to the portion of the vehicle frame 4 forming the driver's cab. The vehicle frame 4, in the vicinity of the drive unit, has a curved receptacle plate 4*a*, which is connected with an upper hollow section 4*b*, a lower hollow section 4*c* and a curved frame plate.

Figure 3:
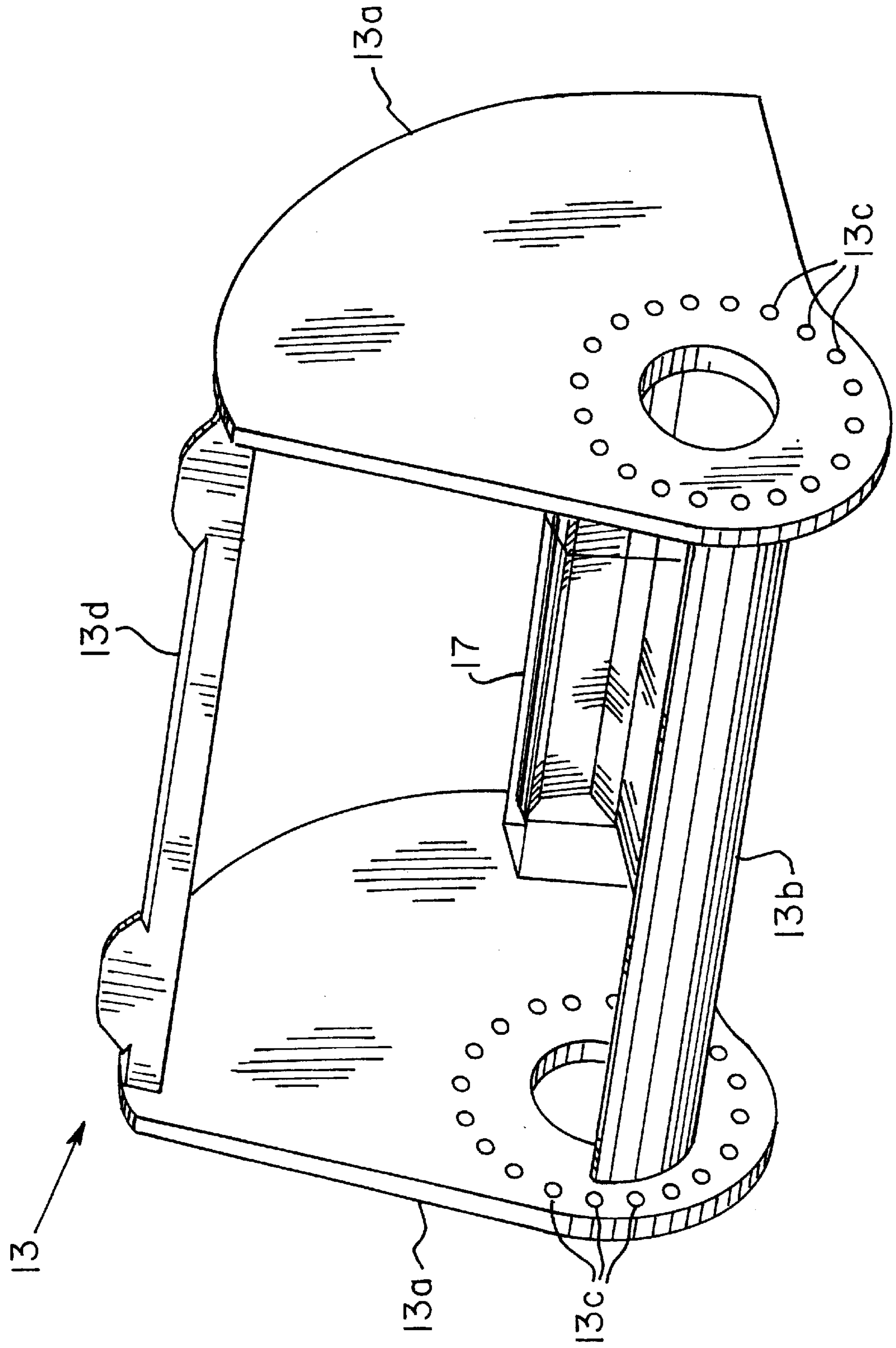
FIG. 3 is a perspective view of the housing of a drive unit of the industrial truck.

FIG. 3, for purposes of clarification, shows a view in perspective of the housing 13 of the drive unit. The figure shows the side plates 13*a*, the base plate 13*b*, the ring of holes 13*c* and the transverse strut 13*d*.

The fork lift truck illustrated in FIG. 1 has a lifting platform 11 that is connected directly or indirectly with the vehicle frame of the fork lift truck. At a bottom fastening point 9, the lifting platform 11 is connected in a hinged manner with the housing 13 of the drive unit. The lifting platform 11 can be tilted around an axis that runs in the transverse direction of the fork lift through the bottom fastening point 9. The bottom fastening point 9 is realized so that there is an elastic damping element between a metal part of the lifting platform 11 and a metal part of the housing of the drive unit.

At the upper portion shown in FIG. 1, the lifting platform 11 is connected with the vehicle frame 4 by means of a hydraulic cylinder 2. In this case, there are elastic damping elements both at the fastening point 1 between the lifting platform 11 and the hydraulic cylinder 2, and also at the fastening point 3 between the vehicle frame 4 and the hydraulic cylinder 2. These fastening points 1, 3 are configured so that they can transmit both compression and tension forces.

Possible embodiments of the fastening points for fastening the lifting platform to the vehicle frame are described in greater detail in the German patent application filed on the same date under the internal case number A 98/137 (Serial No. 198 49 768.7), which is herein incorporated by reference.

Figure 4:
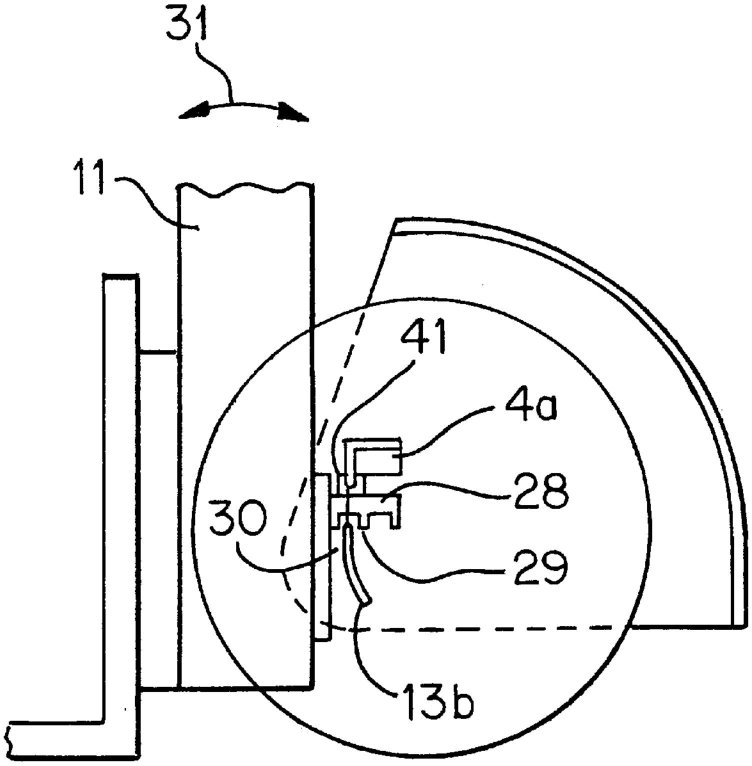
FIG. 4 shows a bottom fastening point of a lifting platform in accordance with the invention.

FIG. 4 shows a possible embodiment of the bottom fastening point 9. The fastening point 9 includes a first or lower fastening element 27 (e.g., first fastening element) for connecting a lower end 30 of the lifting platform 11 to the base plate 13*b* of the housing 13 and thereby to the vehicle frame 4. Attached to the lifting platform 11 are holding means, e.g., a holding rail 28, that extend in the transverse direction of the fork lift truck. An elastic damping element, or first elastic damping element, 29 is located between the holding rail 28 and the leading edge of the base plate 13*b* of the drive unit housing 13. When the lifting platform 11 tilts in the direction 31, the first elastic damping element 29 is elastically deformed, whereby under no operating conditions does the lifting frame 11 enter into direct contact with the vehicle frame 4. The weights and horizontal forces acting on the lifting platform 11 are transmitted exclusively by means of the first elastic damping element 29. Above the holding rail 28, the first or lower fastening element 27 includes a second elastic damping element 41 that is fastened to the curved receptacle plate 4*a* that is connected to the vehicle frame 4. The second elastic damping element 41 fulfills the function of a hold-down and secures the holding rail 28 in the vertical direction.

Figure 5:
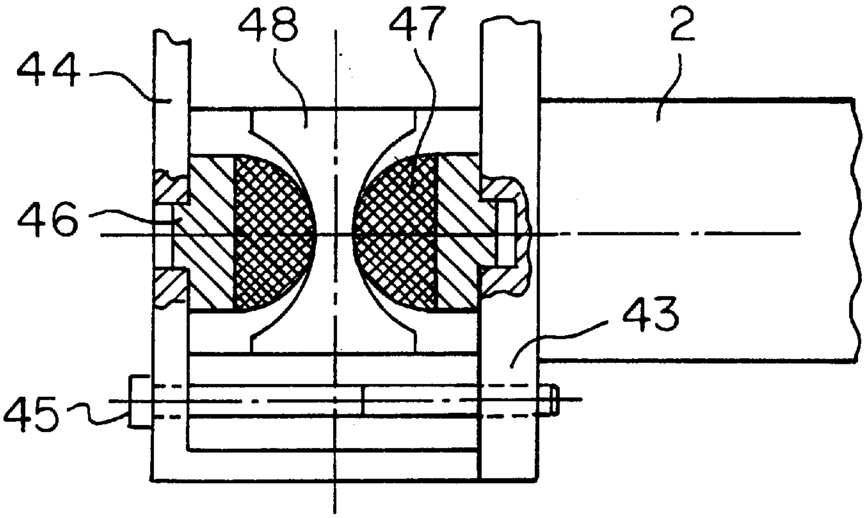
FIG. 5 shows a top fastening point of a lifting platform in accordance with the invention.

FIG. 5 shows one possible embodiment for the fastening points 1,3 shown in FIG. 1. The fastening points 1,3 each include a fastening element 42. Thus, fastening point 1 includes a fastening element 42, or second fastening element, for connecting the lifting platform 11 to the hydraulic cylinder 2. Similarly, the fastening point 3 also includes a fastening element 42, or third fastening element, for connecting the hydraulic cylinder 2 to the portion of the vehicle frame 4 forming the driver's cab. The first and second fastening elements 42 each include a plate 43 rigidly attached to a cylinder tube of the hydraulic cylinder 2. Fastened to the plate 43 by means of threaded fasteners 45 is an angular or U-shaped component 44, which has a surface that is substantially parallel to the plate 43. Fastened to the plate 43 and to the component 44 are respective damping elements 46 and 47. Between the damping elements 46, 47 there is a bearing shell 48 which is rigidly connected with the lifting platform 11, by methods customary in the art such as welding, mechanical fasteners, or a clamped attachment. Both tension and compression forces can be transmitted between the lifting platform 11 and the hydraulic cylinder 2 by the damping elements 46, 47 located on both sides of the bearing shell 48. The invention teaches that the transmission of vibrations is prevented by the damping elements 46, 47. This shaping of the bearing shell 48 and the damping elements 46, 47 makes it possible to compensate for any angular displacement between the lifting platform 11 and the hydraulic cylinder 2, of the type that can occur, for example, in the event of a tilting of the lifting platform 11.

It will readily be appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. An industrial truck, comprising:

a vehicle frame, with the vehicle frame including a portion forming a driver's cab of the industrial truck;

a drive unit housing connected to the portion of the vehicle frame forming the driver's cab by at least one fastening element having at least one elastic damping element;

a front wheel drive unit including two front wheels of the industrial truck, with the front wheel drive unit located in the housing;

a rear weight connected to the vehicle frame, with the rear weight in the form of a metal block of large mass sufficient to prevent transmission of vibrations into the vehicle frame; and an oscillation-generating internal combustion engine fastened directly to the rear weight by an additional fastening element having at least one elastic damping element, wherein the additional fastening element having the at least one elastic damping element supports the engine on the rear weight and dampens vibrations of the engine during operation of the industrial truck, and wherein the front wheel drive unit includes at least one oscillation-generating component, and wherein the at least one fastening element connecting the housing to the portion of the vehicle frame forming the driver's cab dampens vibrations of the oscillation-generating component during operation of the industrial truck.

2. The industrial truck as claimed in claim 1, wherein the vehicle frame is a multi-piece frame.

3. The industrial truck as claimed in claim 1, wherein the vehicle frame is a one-piece vehicle frame.

4. An industrial truck as claimed in claim 1, wherein the at least one oscillation-generating component is a hydraulic motor which is connected with the front wheels of the industrial truck.

5. The industrial truck as claimed in claim 1, wherein the at least one oscillation-generating component is a hydraulic motor, wherein the hydraulic motor is located in the housing, and wherein the hydraulic motor is connected with the front wheels of the industrial truck.

6. The industrial truck as claimed in claim 1, wherein the housing further includes:

a pair of parallel side plates;

a curved base plate connecting the side plates; and a transverse strut connecting the side plates opposite from the base plate, wherein the side plates each define a ring of holes for connecting the front wheel drive unit to the housing.

7. The industrial truck as claimed in claim 6, wherein the at least one fastening element connecting the housing to the portion of the vehicle frame forming the driver's cab includes a pair of fastening elements, and wherein the transverse strut is secured to the portion of the vehicle frame forming the driver's cab by a first fastening element of the pair of fastening elements.

8. The industrial truck as claimed in claim 7, wherein the base plate is secured to the vehicle frame by a second fastening element of the pair of fastening elements.

9. An industrial truck, comprising:

a vehicle frame, with the vehicle frame including a portion forming a driver's cab of the industrial truck;

a drive unit housing connected to the portion of the vehicle frame forming the driver's cab, with the housing having a base plate; and an oscillation-generating lifting platform fastened at a lower end thereof to the base plate by a first fastening element including a first elastic damping element located between the lifting platform and the base plate, with the lifting platform further connected at a top end thereof to the top of the driver's cab by a hydraulic cylinder.

10. The industrial truck as claimed in claim 9, wherein the lifting platform is rotationally connected at the lower end to the base plate by the first fastening element.

11. The industrial truck as claimed in claim 10, wherein the lower end of the lifting platform is connected to the vehicle frame by the first fastening element, which first fastening element further includes a second elastic damping element located between the lifting platform and the portion of the vehicle frame forming the driver's cab.

12. The industrial truck as claimed in claim 9, wherein the lifting frame is connected to the hydraulic cylinder by a second fastening element including at least one elastic damping element located between the lifting frame and the hydraulic cylinder.

13. The industrial truck as claimed in claim 12, wherein the hydraulic cylinder is connected to the top of the driver's cab by a third fastening element including at least one elastic damping element located between the hydraulic cylinder and the top of the driver's cab.

14. The industrial truck as claimed in claim 9, wherein the vehicle frame is a one-piece frame.

15. The industrial truck as claimed in claim 9, wherein the vehicle frame is a multi-piece frame.

* * * * *

UNITED STATES PATENT AND TRADEMARK OFFICE

CERTIFICATE OF CORRECTION

PATENT NO. : 6,454,034 B1

DATED : September 24, 2002

INVENTOR(S) : Bernhard Gotz

It is certified that error appears in the above-identified patent and that said Letters Patent is hereby corrected as shown below:

Column 4,

Lines 39-40, "cab. The vehicle" should read -- cab. The second fastening element 14b includes one or more elastic clamping elements, or second elastic clamping elements 16. The vehicle --.

Signed and Sealed this

Seventeenth Day of June, 2003

JAMES E. ROGAN

*Director of the United States Patent and Trademark Office*